(12) United States Patent
Callaghan

(10) Patent No.: US 6,856,933 B1
(45) Date of Patent: Feb. 15, 2005

(54) VEHICLE ACCESSORY FOR MONITORING TRAVEL DISTANCE

(76) Inventor: Terry S. Callaghan, 4549 Canterwood Dr., Ada, MI (US) 49301

(*) Notice: Subject to any disclaimer, the term of this patent is extended or adjusted under 35 U.S.C. 154(b) by 0 days.

(21) Appl. No.: 10/063,993

(22) Filed: Jun. 2, 2002

Related U.S. Application Data

(63) Continuation of application No. 09/358,661, filed on Jul. 21, 1999, now Pat. No. 6,434,510.

(51) Int. Cl.$^7$ ................................................. G06F 7/00
(52) U.S. Cl. .................... 702/149; 702/97; 702/122; 702/165; 702/182
(58) Field of Search ......................... 235/30 R, 30 A, 235/29 A, 29 B, 33; 701/35, 123; 340/438; 346/33 R; 702/FOR 103–104, FOR 134–135, FOR 141, FOR 146, FOR 150–151, FOR 154–155, FOR 170–171, 97, 116, 122, 127, 142, 145–149, 165, 163, 175–178, 182, 183, 187, 188; 705/400; 377/24.1, 24.2

(56) References Cited

U.S. PATENT DOCUMENTS

| | | | |
|---|---|---|---|
| 3,665,397 A | 5/1972 | Di Napoli et al. | |
| 3,754,122 A | 8/1973 | Dinapoli et al. | |
| 4,547,781 A | 10/1985 | Gelhorn et al. | |
| 4,593,263 A | 6/1986 | Peckworth | |
| 4,685,061 A | 8/1987 | Whitaker | |
| 4,755,832 A | 7/1988 | Gulas et al. | |
| 4,835,546 A | 5/1989 | Keller | |
| 4,875,167 A | * 10/1989 | Price et al. | ............... 346/33 D |
| 5,046,007 A | 9/1991 | McCrery et al. | |
| 5,113,182 A | 5/1992 | Suman et al. | |
| 5,267,159 A | 11/1993 | O'Neall | |
| 5,278,547 A | * 1/1994 | Suman et al. | ............... 340/5.22 |
| 5,337,236 A | 8/1994 | Fogg et al. | |

(List continued on next page.)

Primary Examiner—Carol S. Tsai
(74) Attorney, Agent, or Firm—Price, Heneveld, Cooper, DeWitt & Litton LLP

(57) ABSTRACT

A mileage tracking system including an input device mounted in the vehicle for receiving one of a first and second door unlock signals, and a tripmeter. The tripmeter is coupled to the input device and to a vehicle odometer sensor for accumulating a first accumulated travel distance during vehicle travel following receipt by the input device of the first door unlock signal, and for accumulating a second accumulated travel distance during vehicle travel following receipt by the input device of the second door unlock signal. The tripmeter does not accumulate the first accumulated travel distance during vehicle travel following receipt by the input device of the second door unlock signal. The mileage tracking system also preferably includes a display coupled to the tripmeter for selectively displaying the first and second accumulated travel distance. The input device is preferably a receiver for receiving a signal from a remote transmitter.

25 Claims, 3 Drawing Sheets

U.S. PATENT DOCUMENTS

| | | | | |
|---|---|---|---|---|
| 5,497,323 A | * | 3/1996 | McCall et al. ................. 701/35 |
| 5,513,244 A | * | 4/1996 | Joao et al. ............... 340/425.5 |
| 5,541,858 A | | 7/1996 | Warner |
| 5,550,738 A | * | 8/1996 | Bailey et al. ............ 455/456.5 |
| 5,557,524 A | * | 9/1996 | Maki ......................... 340/995 |
| 5,579,242 A | | 11/1996 | Fisher |
| 5,627,510 A | * | 5/1997 | Yuan .......................... 180/271 |
| 5,635,923 A | | 6/1997 | Steele et al. |
| 5,650,929 A | | 7/1997 | Potter et al. |
| 5,673,017 A | * | 9/1997 | Dery et al. ................. 340/426 |
| 5,673,018 A | * | 9/1997 | Lowe et al. ................ 340/445 |
| 5,694,322 A | * | 12/1997 | Westerlage et al. ......... 705/417 |
| 5,787,373 A | * | 7/1998 | Migues et al. ................ 701/33 |
| 5,805,079 A | * | 9/1998 | Lemelson ............... 340/870.05 |
| 5,815,093 A | | 9/1998 | Kikinis |
| 5,825,286 A | * | 10/1998 | Coulthard ................... 340/442 |
| 5,889,472 A | * | 3/1999 | Nagel et al. ............... 340/5.33 |
| 5,893,893 A | * | 4/1999 | Holt et al. .................... 701/35 |
| 5,917,405 A | * | 6/1999 | Joao .......................... 307/10.2 |
| 5,940,007 A | * | 8/1999 | Brinkmeyer et al. ... 340/825.69 |
| 6,028,537 A | * | 2/2000 | Suman et al. ............... 340/988 |
| 6,049,268 A | * | 4/2000 | Flick ....................... 340/425.5 |
| 6,064,929 A | * | 5/2000 | Migues et al. ................ 701/35 |
| 6,088,636 A | * | 7/2000 | Chigumira et al. ........... 701/26 |
| 6,088,650 A | * | 7/2000 | Schipper et al. ............ 701/207 |
| 6,115,655 A | * | 9/2000 | Keith et al. ................. 701/211 |
| 6,141,610 A | | 10/2000 | Rothert et al. |
| 6,166,698 A | | 12/2000 | Turnbull et al. |
| 6,240,365 B1 | * | 5/2001 | Bunn ......................... 701/213 |
| 6,278,936 B1 | * | 8/2001 | Jones ......................... 340/989 |
| 6,285,317 B1 | * | 9/2001 | Ong ...................... 342/357.13 |
| 6,297,781 B1 | * | 10/2001 | Turnbull et al. ............. 343/713 |
| 6,301,533 B1 | * | 10/2001 | Markow ...................... 701/35 |
| 6,353,796 B1 | * | 3/2002 | Schipper et al. ............. 701/207 |
| 6,393,346 B1 | * | 5/2002 | Keith et al. .................. 340/438 |
| 6,408,232 B1 | * | 6/2002 | Cannon et al. ............... 701/29 |
| 6,459,367 B1 | * | 10/2002 | Green et al. ................ 340/440 |
| 2001/0020204 A1 | * | 9/2001 | Runyon et al. ............... 701/35 |

\* cited by examiner

US 6,856,933 B1

VEHICLE ACCESSORY FOR MONITORING TRAVEL DISTANCE

CROSS REFERENCE TO RELATED APPLICATIONS

This application is a continuation of U.S. patent application Ser. No. 09/358,661, entitled VEHICLE ACCESSORY FOR MONITORING TRAVEL DISTANCE, filed on Jul. 21, 1999 by Terry S. Callaghan, now U.S. Pat. No. 6,434,510, the entire disclosure of which is incorporated herein by reference.

BACKGROUND OF INVENTION

The present invention generally relates to a vehicle odometer. More particularly, the present invention relates to an odometer/tripmeter for tracking business and personal mileage traveled by a vehicle.

Individuals who use his/her vehicle for both business and personal use typically have to track their mileage for either business or personal trips in order to be reimbursed or keep records for tax purposes. In some cases, an individual may wish to track the total accumulated mileage for their vehicle for each of several different purposes. For example, an individual may wish or need to keep track of the total mileage traveled when using the vehicle for business or personal use so as to properly track business expenses associated with the vehicle over the course of a year or other time period. Such tracking is important to business owners in the United States, who may deduct from their taxes the percentage of the expenses for a business owned or leased vehicle that is related to the business use of the vehicle.

Currently, to keep track of mileage traveled for a particular trip, an individual may either reset a tripmeter in the vehicle or note the currently displayed reading on the vehicle's tripmeter or odometer prior to commencing the trip. Subsequently, upon completing a trip, the individual must read the tripmeter or odometer and take mental or physical note of the reading prior to driving the vehicle any further distance. Often, however, individuals forget to read the tripmeter or odometer upon commencing or completing the trip or forget to reset the tripmeter in the first place. Thus, current accessories provided in the vehicle for the purpose of tracking vehicle mileage are often of little practical assistance.

The above-noted problems are even more frustrating to those individuals who not only have to track the mileage for each business trip, but also have to add the mileage of each trip to a cumulative annual total. Presently there are no practical, commercially-available vehicle accessories that allow an individual to keep track of cumulative travel distance for a plurality of trips that are not sequentially traveled such as typically occurs when an individual intermittently drives their vehicle for business and personal use. Although most vehicles are now equipped with a tripmeter that tracks mileage separate from the odometer and that can be reset at the beginning of a trip, such tripmeters cannot be stopped from accumulating mileage and then resume accumulating from the last recorded mileage figure. Existing accessories also do not allow for such mileage information to be automatically recorded and transmitted to a computer or other device for tracking mileage for billing, reimbursement, and tax record keeping purposes.

Systems are described in the prior art that enable a driver to track business mileage separately from non-business mileage. See, for example, U.S. Pat. Nos. 5,579,242; 5,497,323; 5,267,159; 5,046,007; 4,875,167; 4,755,832; 4,685,061; 4,593,263; and 4,547,781. However, such systems still require the driver to remember to manually inform the system whether the vehicle is being used for business or personal purposes prior to beginning travel. Also, many such systems include their own housings, multiple push-buttons, and other components such as printers and magnetic disk drives, that make these devices impractical and too expensive to implement in a vehicle.

SUMMARY OF INVENTION

Accordingly, it is an aspect of the present invention to provide a vehicle tripmeter that solves the above problems by making it much easier for the driver to inform the tripmeter whether or not a trip will be for business or personal purposes. More specifically, it is an aspect of the present invention to provide a vehicle tripmeter that enables a driver to inform the tripmeter that a trip is a business trip while performing a function the driver otherwise must perform to enter the vehicle, start the vehicle, or otherwise operate the vehicle. In addition, it is an aspect of the present invention to provide a vehicle tripmeter for separately tracking business mileage that may be readily integrated into commercially available vehicle trip computers without requiring significant hardware modification.

Additional features and advantages of the invention will be set forth in part in the description which follows and in part will be apparent from the description, or may be learned by practice of the invention.

To achieve these and other aspects and advantages, the vehicle mileage tracking system of the present invention comprises an input device mounted in the vehicle for receiving one of a first and second door unlock signals, and a vehicle tripmeter coupled to the input device and to a vehicle odometer sensor for accumulating a first accumulated travel distance during vehicle travel following receipt by the input device of the first door unlock signal, and for accumulating a second accumulated travel distance during vehicle travel following receipt by the input device of the second door unlock signal, wherein the tripmeter does not accumulate the first accumulated travel distance during vehicle travel following receipt by the input device of the second door unlock signal. The vehicle mileage tracking system also preferably includes a display coupled to the vehicle tripmeter for selectively displaying the first and second accumulated travel distance. The input device is preferably a receiver for receiving a signal from a remote transmitter.

The features and advantages of the invention may be realized and obtained by means of the instrumentalities and combinations particularly pointed out in the written description and claims hereof, as well as the appended drawings.

BRIEF DESCRIPTION OF DRAWINGS

The accompanying drawings, which are incorporated in, and constitute a part of, this specification illustrate several embodiments of the invention and together with the description, serve to explain the objects, advantages, and principles of the invention. In the drawings.

DETAILED DESCRIPTION

Figure 1:
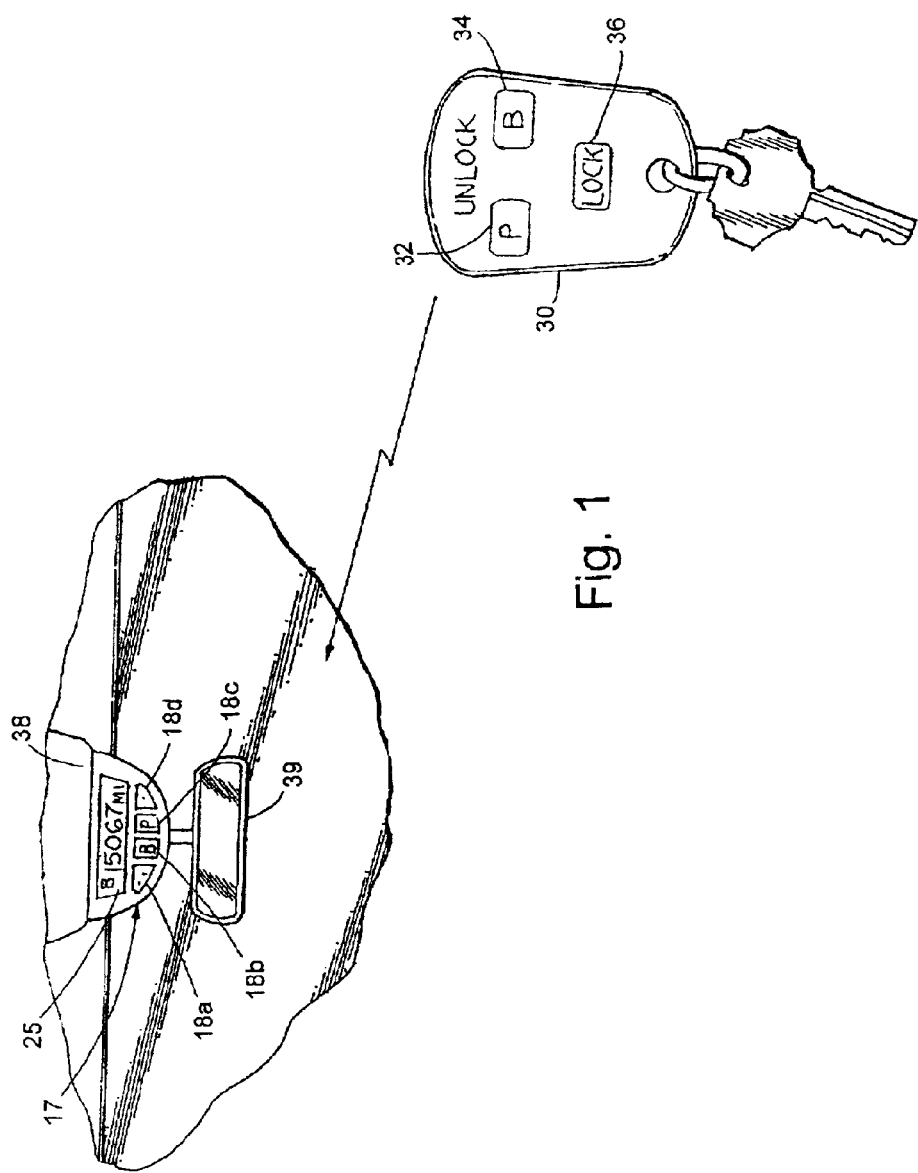
FIG. 1 is a cut-away perspective view of the interior of a vehicle that includes an overhead console incorporating a tripmeter constructed in accordance with the present invention.

As generally noted above, a mileage accumulation and display system constructed in accordance with the present invention includes an input device mounted in the vehicle for receiving one of a first and second door unlock signals, and a vehicle tripmeter coupled to the input device and to a vehicle odometer sensor for accumulating a first accumulated travel distance (e.g., business mileage) during vehicle travel following receipt by the input device of the first door unlock signal, and for accumulating a second accumulated travel distance (e.g., non-business personal mileage) during vehicle travel following receipt by the input device of the second door unlock signal. The tripmeter does not accumulate the first accumulated travel distance during vehicle travel following receipt by the input device of the second door unlock signal. As described in more detail below with reference to FIGS. 1–3, the input device includes a receiver circuit 15 and may also include a switch interface circuit 17. The tripmeter may include a controller 20 and a display 25.

Switch interface circuit 17 may include a plurality of user-activated pushbutton switches, such as switches 18a–18d in a trip computer on an overhead console 38. Switch interface 17 may additionally or alternatively include the vehicle data entry system disclosed in U.S. Pat. No. 5,555,172 entitled "USER INTERFACE FOR CONTROLLING ACCESSORIES AND ENTERING DATA IN A VEHICLE," and filed on Aug. 22, 1994, the disclosure of which is incorporated by reference herein.

According to the most preferred embodiment of the present invention, the input device includes a receiver circuit 15 that is coupled between an antenna 10 and controller 20. Receiver circuit 15 is preferably configured to operate as a remote keyless entry (RKE) receiver and may be responsive to either radio frequency (RF) or infrared (IR) signals. In this manner, receiver 15 may receive door lock and unlock signals from a key fob RKE transmitter 30 (FIG. 1). Unlike other portable RKE transmitters, RKE transmitter 30 includes two different unlock pushbuttons 32 and 34 in addition to a lock pushbutton 36. A first one of the unlock pushbuttons 32 is labeled P or Personal and the second pushbutton is labeled B or Business to signify the purpose of a trip to be taken following entry into the vehicle. It will be appreciated by those skilled in the art that other labels may be used so as to distinguish the two unlock pushbuttons and that more than two such pushbuttons may be provided.

Figure 2:
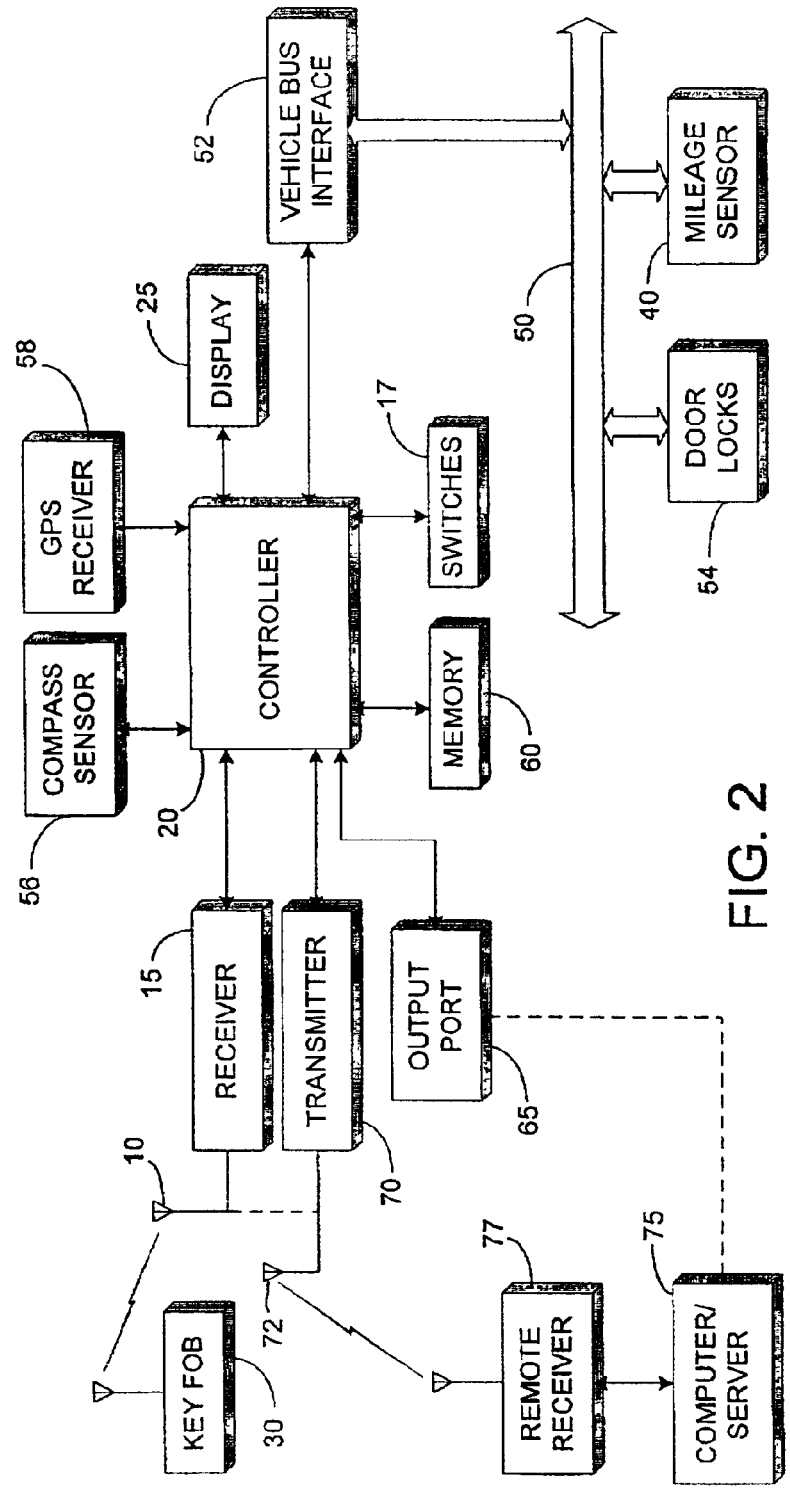
FIG. 2 is an electrical circuit diagram in block form of a tripmeter constructed in accordance with a first embodiment of the present invention.

The vehicle tripmeter is coupled to a mileage sensor (or vehicle odometer) 40 through a discrete direct connection or through a vehicle bus 50 and vehicle bus interface circuit 52 (FIG. 2). While a separate receiver or a separate controller coupled to receiver 15 may be used to transmit the door lock or door unlock commands to the vehicle's door locks 54, controller 20 of the tripmeter may also generate and transmit these commands to door locks 54 either by discrete connection or by communication over vehicle bus 50.

In a most preferred embodiment, controller 20 is the microcontroller of a vehicle trip computer. Such trip computers typically also include a compass sensor 56 and/or GPS receiver 58 as well as non-volatile memory 60 that may be internal or external of controller 20. Conventional trip computers, such as those available from Johnson Controls Inc., generally include a microcontroller, display, compass, user interface switches, and a vehicle bus interface coupled to the vehicle bus. Many of the conventional trip computers are mounted in an overhead console 38 or inside rearview mirror 39 of the vehicle, as are trainable transmitters such as the Homelink®trainable transmitter also available from Johnson Controls Inc. Such trainable transmitters include an antenna, a receiver, and a transmitter coupled to a microcontroller. U.S. Pat. No. 5,627,529 discloses a trainable transmitter that also functions as an RKE receiver. Thus, all of the physical components needed for the carrying out the most preferred embodiments of the present invention are already present in many overhead consoles and rearview mirrors. Further, trip computers typically provide a tripmeter function and include a reset switch for resetting the tripmeter. In addition, many RKE key fob transmitters include three manual switches with one for unlocking the doors, another for locking the doors, and a third for other functions such as unlocking the trunk, panic alarm activation, or unlocking only a specific door. Thus, to implement the preferred embodiments of the present invention, one would only need to reprogram the existing microcontroller(s) to respond to an activation of the third key fob button by unlocking the vehicle's doors and, at the same time, enabling accumulation of either business or personal mileage.

In operation, a driver would simply press the unlock pushbutton 32 labeled P if the trip on which the driver is about to embark is personal or press the unlock pushbutton labeled B if the trip is for business purposes. If unlock pushbutton B 34 is pressed, key fob transmitter 30 transmits a first unlock signal that is received by receiver 15. If unlock pushbutton P 32 is pressed, key fob transmitter 30 transmits a second unlock signal that is received by receiver 15. The second unlock signal is distinguishable from the first unlock signal such that controller 20 may respond differently to the receipt of these signals. In either event, the vehicle doors are unlocked.

Upon receiving the first unlock signal, controller 20 enables a business mileage accumulator to begin or continue accumulation of mileage in response to signals from mileage sensor 40. This is accomplished by programming controller 20 to respond to the first unlock signal by adding to an accumulated value in memory 60 corresponding business mileage in response to signals from mileage sensor 40. Controller 20 could be programmed to reset the business mileage accumulator each time the vehicle ignition is turned off. This would allow separate trip segments to be stored for subsequent recordation in a travel log.

By providing sufficient memory, a plurality of such trip segments may be date- and time-stamped and stored in memory for subsequent recall, a total accumulated mileage and total accumulated business and/or personal mileage may also be stored in memory 60.

If the second unlock signal is received, controller 20 will not add to the accumulated business mileage. Alternatively, the mileage could be accumulated for that trip segment (i.e., from the time the vehicle ignition is turned on until it is turned off), time- and date-stamped, and stored in memory with a designation that the mileage of that segment was for personal purposes.

In the event that neither the first nor the second unlock signal is received prior to detection that the vehicle ignition is turned on, controller 20 may, by default, enable the accumulation of business mileage. Alternatively, controller 20 may be programmed to assume that a non-designated trip is personal as default. To ensure that the driver failed to select business or personal by accident, controller 20 may cause a prompting message to be displayed on display 25 and/or generate an audio or other visual alarm.

If controller 20 is provided with a calendar function, controller 20 may stop accumulating business mileage associated with a specified time period corresponding to a period in which taxes are calculated (e.g., a calendar year or quarter). Additionally, controller 20 may begin accumulating business mileage data for the next tax or calendar year in a separate memory location. This allows the user to wait until a convenient time to download the mileage data for a given tax period. In addition to the accumulated business mileage data for a given tax period, the vehicle odometer readings for the beginning of the tax year and the end of the tax year may also be stored and downloaded. This allows a calculation of the percentage of miles that the vehicle was driven for business purposes during any given tax year.

In some cases, the driver of the vehicle is reimbursed for mileage on a trip-by-trip basis. For such drivers, the fact that the inventive tripmeter automatically stores time- and date-stamped mileage segments is particularly advantageous.

The mileage stored in memory 60 may be accessed using several different methods. A first method is simply to display the mileage on display 25 when prompted to do so by the user. A step switch could be used to step through the stored time and date-stamped mileage segments. If the vehicle is equipped with a large display such as those used in a vehicle navigation system, the mileage data may be transferred to that display over the vehicle bus.

A second method is to provide the vehicle or tripmeter with a data output port 65 to which a portable electronic device, such as a laptop or pocket computer, may be coupled for downloading the data. The data may be formatted for integration into any accounting or financing program. Such formatting would be particularly advantageous when the user prepares his or her own taxes using a program such as TurboTax®from Intuit Inc., or the like.

A third method for accessing the data is to transmit the data using a wireless communication link. The wireless communication link may be IR or RF. If the vehicle is equipped with a trainable transmitter 70, the transmitter and antenna 72 of the transmitter may be used for transmitting the mileage data. The transmitted RF mileage data may be input into a computer 75 using several different setups. One setup would be to transmit the data to a receiver 77 coupled to the AC power lines of the driver's home or office. The receiver would then modulate the received mileage data on the AC power such that it may be received by a communication module coupled to the user's personal or laptop computer. Such a system would function similar to the X-10® system available from X-10 Limited, of Hamilton, Bermuda.

The user's home or business computer may have an RF transceiver 77 coupled directly to that computer 75 or indirectly through a local area network (LAN), a wide area network (WAN), or through a global network such as the Internet. A particularly useful arrangement for a business would be to provide a transceiver near one or all entrance gates to the employee parking lot(s) to transmit and receive signals from the employees' vehicles as they travel through entrance gates. The transceiver could constantly transmit interrogation signals to which the tripmeters would respond by transmitting any mileage data back to the transceiver. The mileage data could be coded with a vehicle or driver identification code for purposes of reimbursing the employee. If the computer system connected to such a transceiver were programmed appropriately, the computer system could automatically generate reimbursement forms and e-mail them to the office computer of the driver of the vehicle so that the driver may enter any necessary information into the request and e-mail it back to the accounting department for issuance of a reimbursement check. Alternatively, if no additional information is needed from the driver, the mileage data may be transferred directly to the accounting department for automatic or manual printing of a reimbursement check.

In a similar manner, a user may place a transceiver in their home for transmitting and receiving signals from the vehicle's memory. Thus, the user's home computer may determine, for example, that it is December 31 of a particular year and transmit an interrogation signal to the vehicle to cause the vehicle tripmeter to transmit back the mileage data for that year.

The vehicle tripmeter of the present invention could also prompt the driver to verify a selection. For example, the tripmeter could, after receiving one of the first or second door unlock signals, display a message such as Business, Business Trip Selected, Personal, or Personal Trip Selected. The vehicle tripmeter thus prompts the driver to press a particular switch or sequence of switches to change the purpose of the trip if the driver wishes to change his or her initial selection. The vehicle tripmeter could also be programmed to only actively seek verification upon certain circumstances. For example, since commuting to work generally does not qualify as a tax-deductible business trip, the vehicle may ask for verification that a selected trip purpose is in fact for business when the vehicle determines that it is located at the driver's home residence. The vehicle may make such a determination based upon GPS data from GPS receiver 58, or from an activation of the trainable transmitter to transmit a garage door opening/closing signal just prior to ignition shut down in the prior ignition cycle. Additionally, a home transceiver could issue a beacon signal that is received by receiver 15 when the vehicle is in proximity to the driver's home. Conversely, when the driver selects a personal trip when the tripmeter knows that the vehicle is at an offsite business location or client location, it can prompt the driver to verify that the purpose of the trip is in fact personal. The tripmeter may determine that the vehicle is so located based upon GPS data and the past history for trips to locations having the same relative GPS position.

Figure 3:
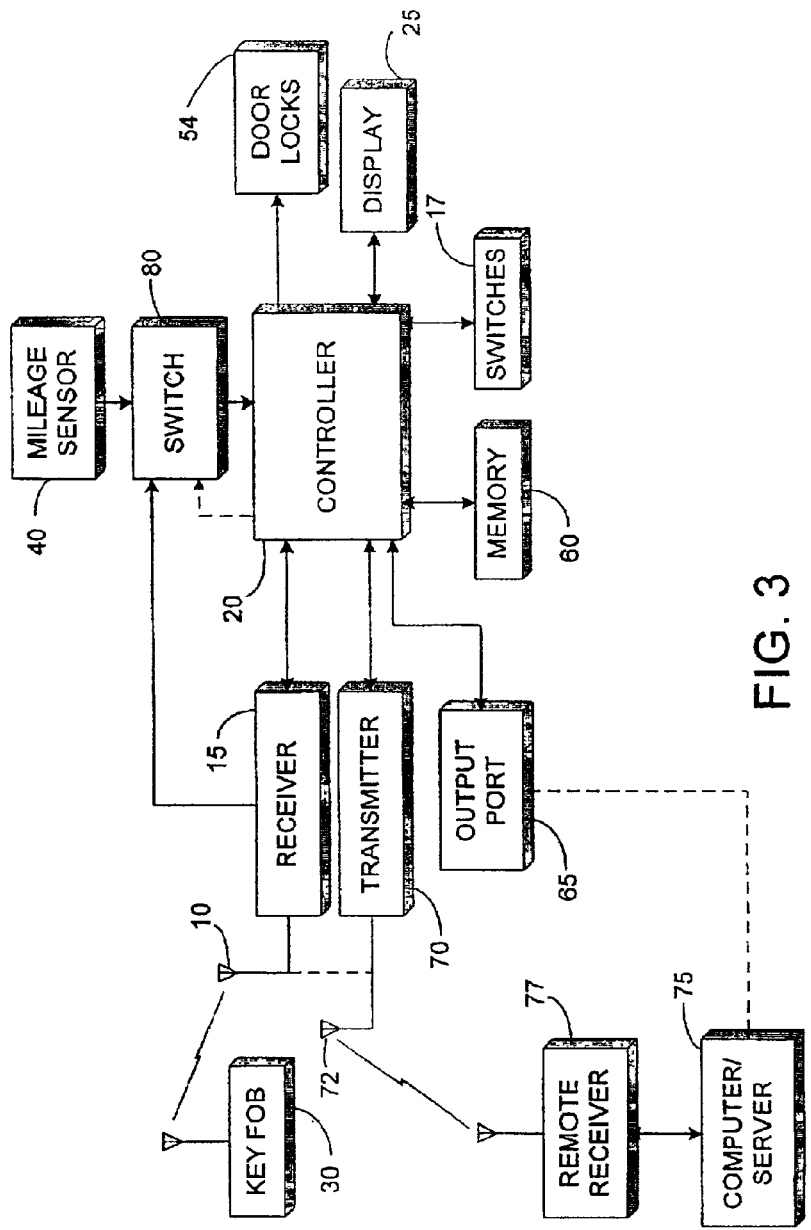
FIG. 3 is an electrical circuit diagram in block form of a tripmeter constructed in accordance with a second embodiment of the present invention.

FIG. 3 shows a second embodiment of the present invention, which differs from the first embodiment in that a switch 80 is provided between mileage sensor 40 and controller 20. Switch 80 may be opened to prevent controller 20 from receiving and accumulating the mileage clock signal from mileage sensor 40 as business trip mileage. Conversely, switch 80 may be closed to allow controller 20 to receive and accumulate the mileage clock signal from mileage sensor 40. In this manner, controller 20 may be implemented using an existing microprocessor in a vehicle trip computer that does not need to be reprogrammed since such existing microprocessors merely count the clock pulses it receives. Further, if receiver 15 directly or indirectly transmits the unlock signals to door locks 54, controller 20 need not be coupled to receiver 15.

Switch 80 may be controlled by a switching signal transmitted from receiver 15 or optionally from controller 20. Switch 80 could also be a manual switch that is activated by the driver. Preferably, switch 80 may be actuated by controller 20 since controller 20 could close or open switch 80 in response to manual activation of one or more of user-actuated switches 17.

Although the inventive tripmeter has been described with respect to two trip purposes (e.g., business and personal), the concepts described and claimed herein may be used to identify more than two purposes. For example, separate mileage designations may be made for each business account or for different businesses.

The above description is considered that of the preferred embodiments only. Modifications of the invention will occur to those skilled in the art and to those who make or use the invention. Therefore, it is understood that the embodiments shown in the drawings and described above are merely for illustrative purposes and not intended to limit the scope of the invention, which is defined by the following claims as interpreted according to the principles of patent law, including the doctrine of equivalents.

What is claimed is:

1. A mileage display system for a vehicle comprising:
   a receiver for receiving a signal from a remote transmitter;
   a mileage accumulator coupled to said receiver for accumulating vehicle mileage received from a mileage sensor as the vehicle travels in response to a signal received by said receiver from the remote transmitter; and
   a display for displaying the vehicle mileage accumulated by said mileage accumulator.

2. The mileage display system as defined in claim 1, wherein said mileage accumulator includes an interface for coupling to an odometer sensor of the vehicle to receive a vehicle travel distance signal from which the vehicle mileage may be ascertained.

3. The mileage display system as defined in claim 2, wherein said mileage accumulator further includes a switching device coupled to said interface for receiving and selectively transmitting the vehicle travel distance signal.

4. The mileage display system as defined in claim 3, wherein said mileage accumulator further includes: a memory device for storing cumulative travel distance; and a processing circuit coupled to an output of said switching device and to said memory for calculating cumulative travel distance in response to the vehicle travel distance signal selectively transmitted through said switching device and for storing the cumulative travel distance in said memory.

5. The mileage display system as defined in claim 4, wherein said processing circuit is coupled to said receiver and controls said switching device to transmit the vehicle travel distance signal when the signal is received from said receiver.

6. The mileage display system of claim 1 and further comprising an input device mounted in the vehicle for receiving an input representing whether a trip is for business or personal purpose and for generating a signal representing the received input, wherein said mileage accumulator is coupled to said input device for accumulating vehicle mileage received from the mileage sensor as the vehicle travels in response to the signal received from said input device.

7. A vehicle mileage tracking system comprising:
   a tripmeter mounted in a vehicle for tracking travel distance of the vehicle;
   a transmitter mounted in the vehicle coupled to said tripmeter for transmitting the travel distance;
   a receiver remotely located from the vehicle for receiving the travel distance transmitted by said transmitter; and
   a computer server remotely located from the vehicle and coupled to a local area network and to said receiver for receiving and storing the travel distance received by said receiver,
   wherein said tripmeter further stores an indicator in association with each trip segment whether the trip segment was a business trip or a personal trip, and wherein said computer server generates an electronic mail message including the vehicle identification code and travel distance.

8. A mileage tracking system for use in a vehicle, said mileage tracking system comprising:
   a tripmeter for tracking travel distance of the vehicle;
   an input device mounted in the vehicle for receiving an input representing whether a trip is for business or personal purpose and for generating a signal representing the received input, wherein said tripmeter is coupled to said input device for accumulating vehicle mileage received from a mileage sensor as the vehicle travels in response to the signal received from said input device; and
   a transmitter coupled to said tripmeter for transmitting the travel distance to a receiver that is remotely located from the vehicle,
   wherein said vehicle tripmeter further stores an indicator in association with each trip segment whether the trip segment was a business trip or a personal trip.

9. The mileage tracking system as defined in claim 8, wherein said input device is a receiver for receiving a signal from a remote transmitter.

10. The mileage tracking system as defined in claim 8, wherein said vehicle tripmeter time- and date-stamps mileage trip segments that are recorded between periods defined by the vehicle ignition being turned on and off.

11. The mileage tracking system as defined in claim 8, wherein said tripmeter totals one of the travel distances traveled during a specified period of time.

12. The mileage tracking system as defined in claim 11, wherein each said specified time period is a period during which taxes are calculated.

13. The mileage tracking system as defined in claim 11, wherein each said specified time period is a calendar year.

14. The mileage tracking system as defined in claim 11, wherein the mileage said tripmeter totals during each specified time period is business mileage.

15. The mileage tracking system as defined in claim 8 and further including a display coupled to said vehicle tripmeter for selectively displaying the travel distance.

16. The mileage tracking system as defined in claim 8, wherein said input device is an RF receiver for receiving RF first and second door unlock signals from a remote transmitter.

17. A mileage tracking system for use in a vehicle, said mileage tracking system comprising:
   a tripmeter for tracking travel distance of the vehicle;
   an input device mounted in the vehicle for receiving first and second door unlock signals, wherein said tripmeter coupled to said input device and to a vehicle odometer sensor for displaying mileage accumulated during vehicle travel following receipt by said input device of said second door unlock signal, wherein said tripmeter does not accumulate mileage during vehicle travel following receipt by said input device of said first door unlock signal; and
   a transmitter coupled to said tripmeter for transmitting the travel distance to a receiver that is remotely located from the vehicle;
   wherein said transmitter is a transceiver for receiving an interrogation signal and for transmitting vehicle mileage in response to the interrogation signal.

18. The mileage tracking system as defined in claim 17, wherein said input device is an RF receiver for receiving RF first and second door unlock signals from a remote transmitter.

19. The mileage tracking system as defined in claim 17, wherein said transmitter is an RF transmitter for transmitting an RF signal to a receiver coupled to the remote device.

20. The mileage tracking system as defined in claim 17, wherein said input device is a receiver for receiving a signal from a remote transmitter.

21. A vehicle mileage tracking system comprising:
- a tripmeter mounted in a vehicle for tracking travel distance of the vehicle;
- an input device mounted in the vehicle for receiving an input representing whether a trip is for business or personal purpose and for generating a signal representing the received input, wherein said tripmeter is coupled to said input device for accumulating vehicle mileage received from a mileage sensor as the vehicle travels in response to the signal received from said input device;
- a transmitter mounted in the vehicle coupled to said tripmeter for transmitting the travel distance;
- a receiver remotely located from the vehicle for receiving the travel distance transmitted by said transmitter; and
- a computer coupled to said receiver for receiving and storing the travel distance received by said receiver;
- wherein said tripmeter further stores an indicator in association with each trip segment whether the trip segment was a business trip or a personal trip.

22. The vehicle mileage tracking system of claim 21, wherein said computer is configured to automatically generate and store an electronic record indicating the vehicle and travel distance.

23. The vehicle mileage tracking system of claim 21, wherein said computer is a computer server coupled to a local area network.

24. The vehicle mileage tracking system of claim 21, wherein said transmitter is a transceiver for receiving an interrogation signal and for transmitting vehicle mileage in response to the interrogation signal.

25. The vehicle mileage tracking system as defined in claim 21, wherein said input device is a receiver for receiving a signal from a remote transmitter.

* * * * *